United States Patent [19]

Faroudja

[11] Patent Number: 4,876,596
[45] Date of Patent: Oct. 24, 1989

[54] FILM-TO-VIDEO CONVERTER WITH SCAN LINE DOUBLING

[76] Inventor: Yves C. Faroudja, 26595 Anacapa Dr., Los Altos, Calif. 94022

[21] Appl. No.: 262,321

[22] Filed: Oct. 25, 1988

[51] Int. Cl.⁴ .......................... H04N 7/01; H04N 3/36
[52] U.S. Cl. ..................................... 358/140; 358/11; 358/214
[58] Field of Search ..................... 358/11, 12, 54, 137, 358/140, 141, 214

[56] References Cited

U.S. PATENT DOCUMENTS

| | | | |
|---|---|---|---|
| 4,346,408 | 8/1982 | Massmann | 358/214 |
| 4,399,465 | 8/1983 | Massmann | 358/214 |
| 4,479,146 | 10/1984 | Cohn | 358/147 |
| 4,633,293 | 12/1986 | Powers | 358/54 |
| 4,720,744 | 1/1988 | Washi et al. | 358/141 |

FOREIGN PATENT DOCUMENTS 53-79421  7/1978  Japan ..................................... 358/11

*Primary Examiner*—John W. Shepperd
*Assistant Examiner*—Michael D. Parker
*Attorney, Agent, or Firm*—David B. Harrison

[57] ABSTRACT

Improved apparent picture quality in film-to-video transfer television systems operating in accordance with an odd ratio between film frame display rate and television scan field/frame rate and wherein the video scan line rate is multiplied by an integer for display at an output television display device is achieved by the steps of:

a. transferring each film frame to a television signal of predetermined numbers of even and odd video fields at nominal line scan rate in accordance with a predetermined transfer scheme related to the odd ratio;
b. putting the television signal through a transfer medium;
c. receiving at a receiver the television signal from the transfer medium;
d. selectively passing the received television signal through plural, series connected field period delays to provide an undelayed portion and plural delayed signal portions, the total number of such portions being related to the odd ratio;
e. separately time compressing each portion of the received television signal in accordance with an inverse of the integer to provide an undelayed and plural delayed signal time compressed components; and,
f. selecting at a multiplexer among the undelayed and the plural delayed components so as to derive line multipled even and odd output video fields which, when displayed on a display of the receiver, manifest spatially aligned images corresponding to the original film frames.

21 Claims, 7 Drawing Sheets

FILM-TO-VIDEO CONVERTER WITH SCAN LINE DOUBLING

FIELD OF THE INVENTION

The present invention relates to motion picture film-to-video image conversion systems and methods. More particularly, the present invention relates to apparatus and methods for improving apparent picture quality in film-to-video conversions in which scan line doubling techniques are employed.

BACKGROUND OF THE INVENTION

Film and television image generation systems give rise to the appearance to the viewer of continuously moving visual images. Actually, the appearance of continuous motion results from visual and mental integration by the viewer of rapidly advancing sequences of still frame images.

Conventionally, in countries having a 60 Hz primary power distribution frequency, motion picture films are generated and are projected at one frame rate, such as 24 frames per second, while television images are generated and displayed at another frame rate, such as 30 frames per second (60 dual-interlaced fields per second, or more precisely 59.94 Hz for the NTSC color standard).

Line scan doubling techniques have been proposed to overcome some of the drawbacks resulting from the early adoption of the 262.5 line per field scan standard for television. When the number of scan lines per field is doubled, and the result is presented in progressive scan per field format, improved visual appearance, particularly with large screen display formats, is realized.

The combination of conventional three to two pulldown ratio on film-to-video transfers and concomitant scan line doubling at the picture display gives rise to an unpleasant "shimmering" or "ragged edge" quality with moving picture images (transitions) in the resulting picture display content.

FIG. 1 illustrates a conventional prior art approach to film-to video transfer with line doubling. Graph A marks a time scale wherein each division represents one sixtieth of a second. Graph B denotes the time intervals of six film frames, for example, frame A, frame B, frame C, frame D, frame E, and frame F. At a 24 frame per second rate, each frame covers a 2.5/60th second still frame interval of action. As filmed, and as conventionally projected outside of television, each frame is projected for the same time interval. The projector light beam is nominally cut off while the film is advanced one frame, and the next frame is then projected during the uniform projection interval, and so forth.

Graph C of FIG. 1 illustrates the scan periods of odd and even television fields at the conventional 60 field per second rate. It is immediately apparent that a time discrepancy exists between the television field (graph C) and the film frames (graph B). Conventionally, this discrepancy has been resolved by projecting the first film frame A e.g. for three television fields, the second film frame B for two television fields, the third film frame C for three fields, the fourth film frame D for two fields, the fifth film frame E for three fields, the sixth film frame F for two fields, etc. This method yields the three to two film-to-video transfer with resultant conventional interlaced video.

Line doubling from e.g. 525 scan lines to 1050 scan lines has been proposed in the prior art in order to increase the apparent vertical dimension resolution of television picture displays and to overcome drawbacks otherwise associated particularly with large screen picture displays. FIG. 2A graphs a hypothetical, exemplary seven line, 2/1 interlace video system (wherein a low number of lines (seven) is selected to aid clarity of understanding). Graph A shows an odd field comprising scan lines 1, 3, 5 and one half of 7, and an even field including one half of scan line 7, and scan lines 2, 4 and 6, in a repeating pattern. FIG. 2B illustrates a simplified structure 10 to achieve line doubling of the graph A scan pattern. This exemplary prior art structure 10 omits motion detection and modification structure also to aid clarity in understanding. Incoming video at the conventional scan rate (graph A of FIG. 2A) branches at an input 12 into two paths, including a path leading through a 2/1 time compressor 14 to a summing junction 16 and an output 18. The time compressor 14 compacts the original scan line information into one half of the original time devoted to the scan line.

The other path leads through a one field delay 20 and a 2/1 time compressor 22 to the summing junction 16 and output 18. The time compressor 14 provides the FIG. 2A, graph B, time compressed scan lines 1, 3, 5, 7, 2, 4, 6, 8, etc. The one field delay 20 provides a one field delay offset to the incoming video (FIG. 2A, graph C) and the second 2/1 time compressor 22 time compresses the graph C delayed scan lines to provide the scan lines graphed as D in FIG. 2A. The summing junction 16 combines the graphs B and D time compressed line scans into progressive scan line doubled frames at the original field rate, wherein each frame contains twice the number of scan lines as the original field, as graphed in graph E of FIG. 2A.

When line doubling techniques are applied to conventional 3/2 pull down film-to-video transfers, temporal discrepancies become manifested between even and odd scan lines in the presence of motion. In order to achieve conventional line doubling, as explained in conjunction with FIG. 2 above, the film-to-video transfer is delayed by one field period (1/60th of a second) as shown in graph E of FIG. 1 and is combined as shown in graph F thereof in the field domain. In FIG. 1 graph F, the temporal discrepancies become apparent, since the resultant odd and even fields do not line up.

During a first time interval U, which nominally is 1/30th of a second and represents film frame B, the odd line scans for frame B are beginning before the even line scan for frame B. During the next, longer 1/20th of a second time interval V for film frame C, the odd scan lines are likewise occurring before the even lines. During the third, 1/30th second interval W for film frame D and the fourth, 1/20th second interval X for film frame E, the situation reverses, and the even scan lines are occurring before the odd scan lines. FIG. 3 graphs the repetitively inverting scan line displacements in the line doubled display. The repetitive inversions of lag and lead between pairs of film frame to video transfers results in the undesirable "shimmering" appearance in the display whenever there is image "motion" (i.e. spatial displacement between like subject matter in successive film frames). While dynamic motion detection methods and circuits have been proposed to correct this defect, e.g. by averaging scanning lines when motion is detected in the picture content, motion detection often fails; and, when it does work, line averaging results in a reduction of vertical resolution.

A hitherto unsolved need has arisen to achieve line doubled fields which do not contain these unwanted artifacts otherwise resulting from 3/2 film-to-video, line doubled transfers in the presence of motion.

SUMMARY OF THE INVENTION

A general object of the present invention is to overcome the limitations and drawbacks incident to prior art film-to-vide transfers within a line doubling television system.

A more specific object of the present invention is to improve the subjective horizontal and vertical picture quality in scan line doubled film-to-video transfers, so that apparent picture quality is improved by as much as 30% over unimproved, "shimmering" display images.

A further specific object of the present invention is to provide a simplified scan line doubled film-to-video transfer system which requires no adaptivity or motion detection for proper operation, even in the presence of motion in the cinematographic images.

In accordance with the present invention, apparatus and its method of operation are provided for improving apparent picture quality in film-to-video transfer television systems operating in accordance with an odd ratio between film frame display rate and television scan field rate and wherein the video scan line rate is multiplied by an integer for display at an output television display device. The method of operation comprises the steps of:

a. transferring each film frame to a television signal of predetermined numbers of even and odd video fields at nominal line scan rate in accordance with a predetermined transfer scheme related to the odd ratio;

b. putting the television signal through a transfer medium;

c. receiving at a receiver the television signal from the transfer medium;

d. selectively passing the received television signal through plural, series connected field period delays to provide an undelayed portion and plural delayed signal portions, the total number of such portions being related to the odd ratio;

e. separately time compressing each portion of the received television signal in accordance with an inverse of the integer to provide an undelayed and plural delayed signal time compressed components, f. selecting at a multiplexer among the undelayed and the plural delayed components so as to derive line multipled even and odd output video fields where even and odd lines are sequentially interleaved according to their spatial relation, and wherein each line-multiplexed, sequentially interleaved, even and odd composite video field at the multiplexer output is the representation of a single film frame.

In one aspect of the present invention the odd ratio is five television fields to two film frames, and the received television signal is passed through two serially connected field period delays to provide an undelayed signal portion, a one field period delayed signal portion and a two field period delayed signal portion.

In another aspect of the present invention wherein the line scan rate is multiplied by two and wherein the time compression steps comprise the steps of compressing each portion of the received television signal by one half.

In a further aspect of the present invention the odd ratio is three TV fields to two film frames, the line scan rate is multiplied by two, the received television signal is passed through two serially connected field period delays to provide an undelayed portion, a one field period delayed signal portion, and a two field period delayed signal portion, the time compressing step comprises the step of time compressing each portion by one half, and wherein the selecting step repetitively selects between the undelayed (0), once delayed (1) and twice delayed (2) time compressed signal components in accordance with the following field period selection matrix to provide a repeating continuous video sequence of alpha and beta segments, as follows:

|  | | | | | | |
|---|---|---|---|---|---|---|
| Even Field | 1 0 1 0 1 | alpha | 0 1 2 1 2 | beta | (repeat). |
| Odd Field | 0 1 2 1 2 | | 1 0 1 0 1 | | |

In one more aspect of the present invention these further steps are carried out:

a. generating at least one predetermined marker signal incident to the step of transferring each film frame to a television signal, in order to indicate film-to-video transfer and to distinguish alpha and beta segments;

b. passing the marker signal with the television signal through the transfer medium;

c. receiving the marker signal with the television signal and separating the marker signal therefrom at the receiver; and d. controlling multiplexer operation with the marker signal in order to select among the undelayed, once delayed and twice delayed signal components.

In still one more aspect of the present invention the television signal and the marker signal are encoded in accordance with a predetermined television signal scheme, such as NTSC, the television medium is television broadcast or recording, and the television signal is decoded at the receiver in accordance with the same television signal scheme.

In yet one more aspect of the present invention, the the marker signal is encoded within the vertical synchronizing pulse interval of the television signal.

In still one further aspect of the present invention, the film frame display rate is 24 frames per second and the television field rate is 60 fields per second.

These and other objects, aspects, advantages and features of the present invention will be more fully understood and appreciated by consideration of the following detailed description of a preferred embodiment, presented in conjunction with the accompanying drawings.

DETAILED DESCRIPTION OF A PREFERRED EMBODIMENT

Figure 1:
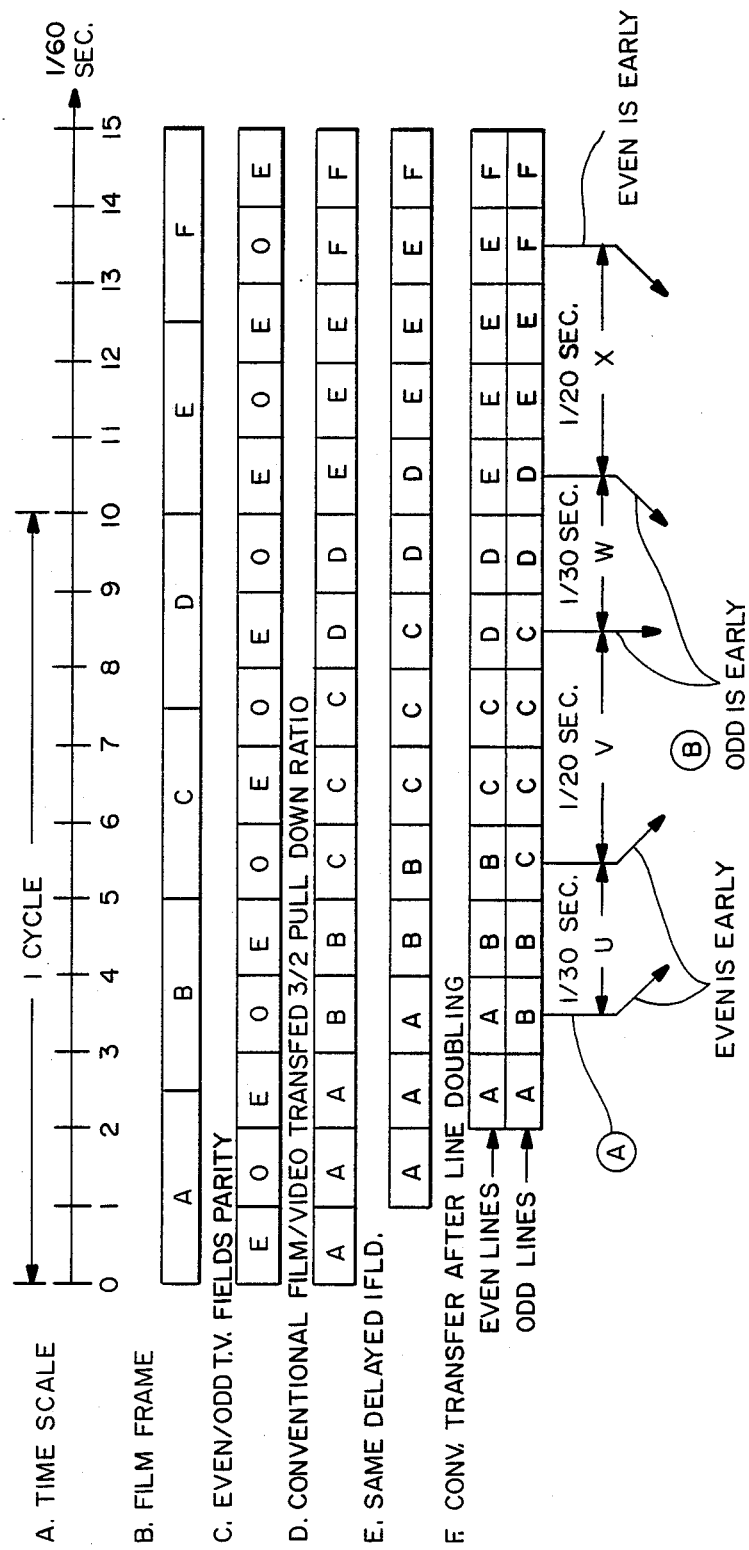
FIG. 1 is a series of graphs which progressively illustrate odd ratio film-to-video transfers and the limitations resulting when scan line doubling techniques are employed.
Figure 2A:
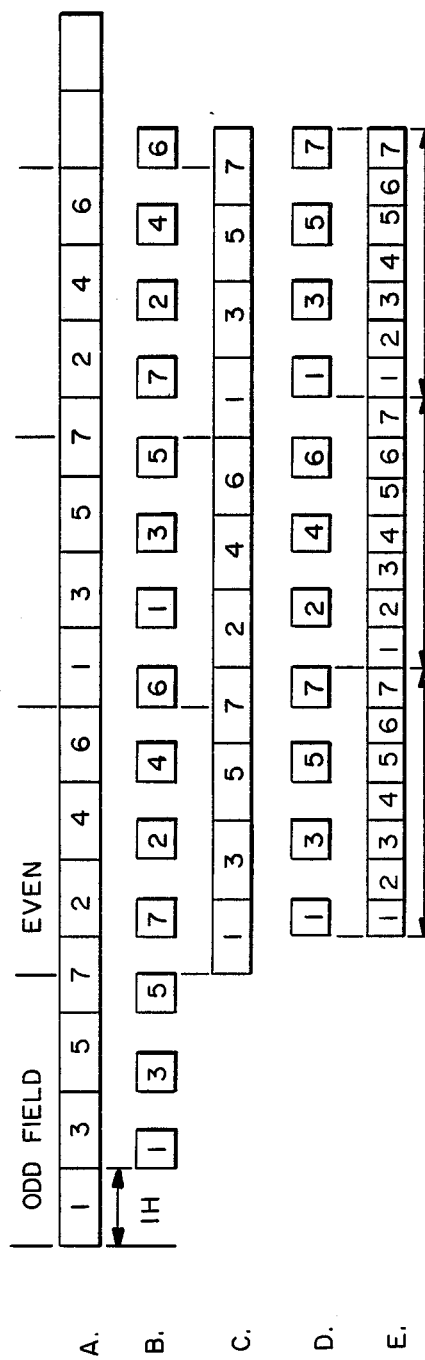
FIG. 2A is a series of graphs which illustrate conventional scan line doubling; and, FIG. 2B is a block diagram of a conventional scan line doubler apparatus.
Figure 2B:
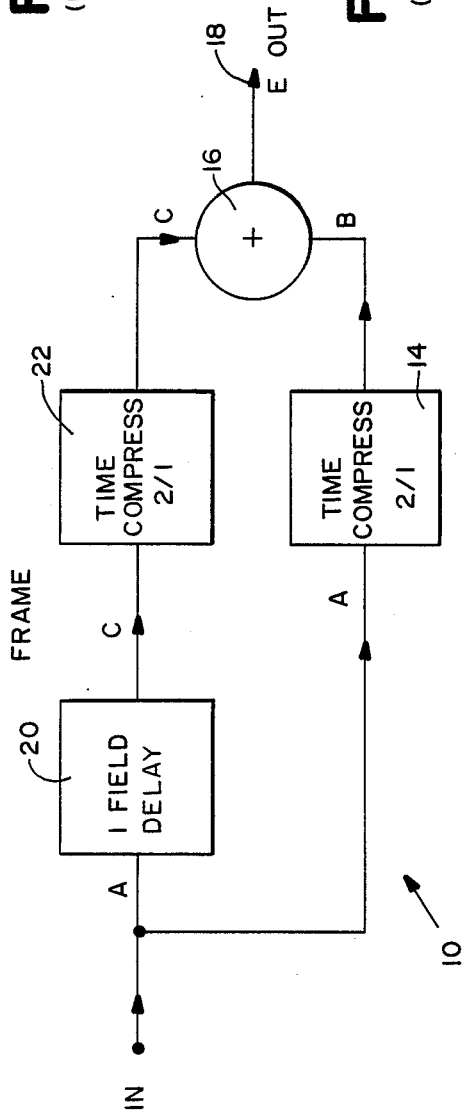
Figure 3:
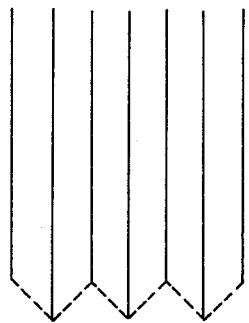
FIG. 3 is a greatly enlarged diagram of several representative portions of television scan lines which have been line doubled in accordance with prior art techniques and which manifest film frame to video lead and lag reversals ("shimmering").
Figure 3:
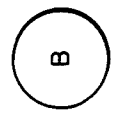
Figure 3:
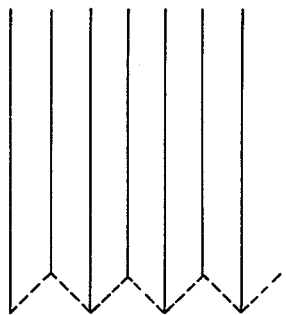
Figure 3:
Figure 3:
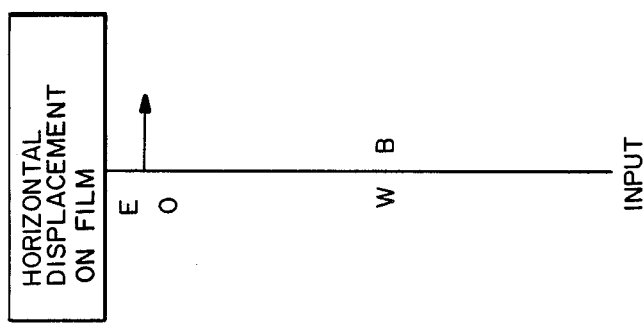
Figure 4:
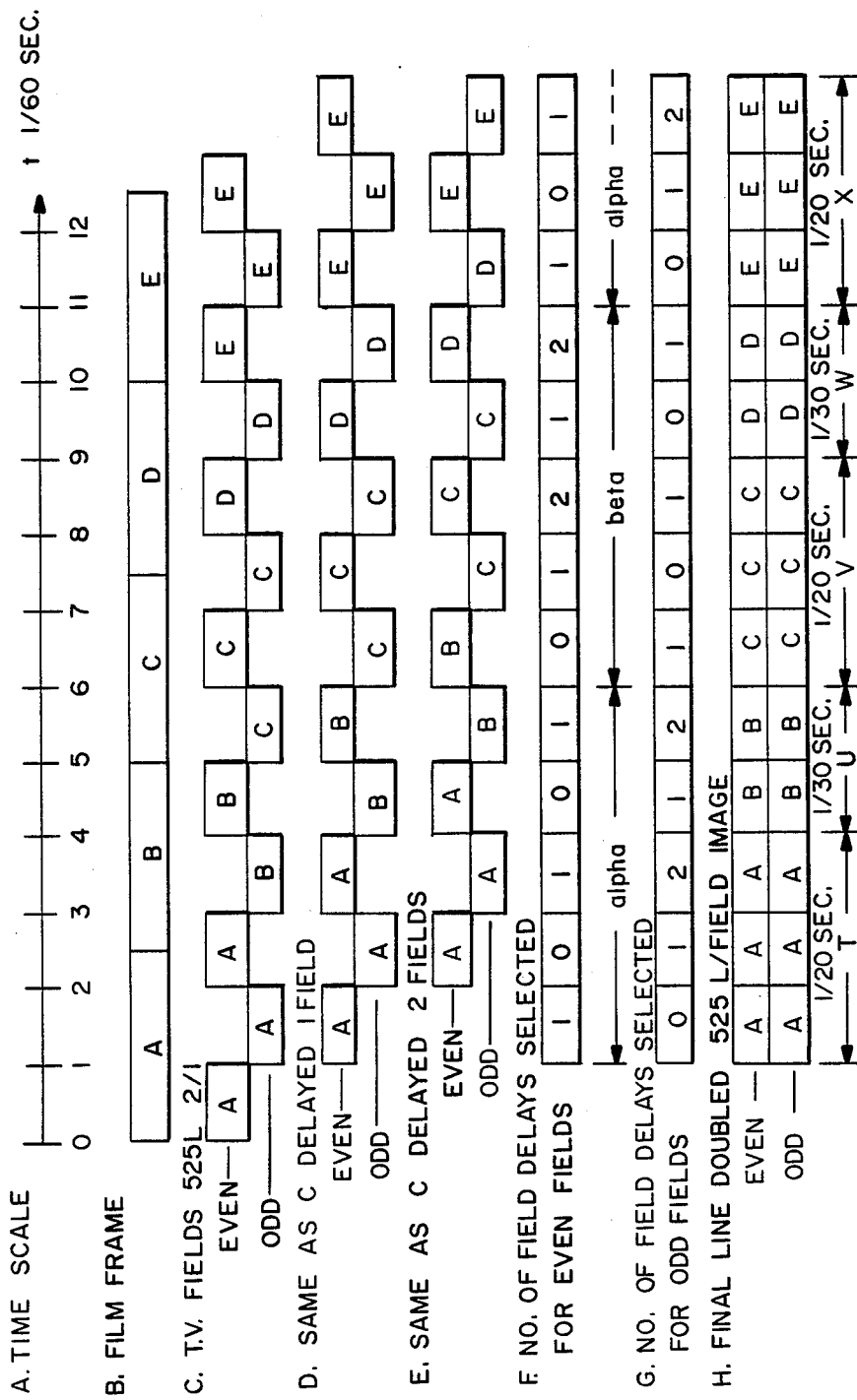
FIG. 4 is a series of graphs which illustrate the method of the present invention for eliminating film frame lead-lag discrepancies and reversals when line doubling techniques are employed.

With reference to FIG. 4, graphs A, B, and C thereof duplicate the correspondingly identified graphs of FIG. 1, discussed above. Graph D of FIG. 4 illustrates the graph C arrangement of film-to-video TV scan fields as delayed by a one field delay. Graph E of FIG. 4 illustrates the graph C arrangement as delayed by a two field delay period. Graphs F and G of FIG. 4 are delay switching conditions for selecting respective field delay periods for even fields and for odd fields in accordance with the principles of the present invention.

It is apparent upon inspection of the graphs C, D and E of FIG. 4 that the sequences graphed as graphs F and G of FIG. 4 are not the only ones possible. In fact, at every fifth field three fields from the same film frame are present as seen in graphs C, D and E. The inventor presently prefers to select the two earliest possible fields in graphs F and G of FIG. 4 thus obtaining the sequence:

```
FIG. 4F: |1 0 1 0 1 |0 1 2 1 2|
FIG. 4G: |0 1 2 1 2 |1 0 1 0 1|.
```

Another sequence in which the two last fields are selected instead of the first two fields can be equally well selected, with equally good results:

```
FIG. 4F: |1 2 1 0 1 |0 1 2 1 2|
FIG. 4G: |0 1 2 1 2 |1 2 1 0 1|.
```

By inspection of graphs F and G of FIG. 4 it is apparent that each field switching pattern requires a five field interval (5/60th of a second), and that there are two basic time interval segments: a first or "alpha" segment and a second or "beta" segment which is a parity inverse of the alpha segment. The alpha and beta segments are repeated sequentially throughout the film-to-video transfer operation.

Scan line doubling of even and odd fields in accordance with the delay patterns graphed in graphs F and G of FIG. 4 results in a line doubled television display image without having spatial lead-lag artifacts, as graphed in graph H of FIG. 4. Thus, in a first interval T there are three even fields and three odd fields for film frame A. In a next interval U there are two even fields and two odd fields for film frame B. In the third interval V there are three even and three odd fields for film frame C, and so forth throughout the film-to-video conversion process. In other words, for each film frame there is an exact correspondence of even and odd scan line doubled fields. This arrangement eliminates the spatial lead-lag artifact manifested as "shimmering" or ragged edges for objects in motion in the displayed image. The resultant line doubled display may be progressive line sequential scan, or it may be field interlaced. An apparent increase of thirty percent in both horizontal and vertical resolution is achieved by practice of the present invention.

While a motion analysis logical circuit may be employed at the receiver to determine the alpha and beta sequences, a more satisfactory approach is to include a sequence control marker and a segment ID marker in the television signal as part of the film-to-video transfer process. This information may easily be included in, and recovered from, the vertical synchronization interval. Preferably, the sequence control marker pulse marks each field generated during a film-to-video transfer; and, the ID marker distinguishes the alpha and beta parities. While a single marker could be employed, by having e.g. multiple markers present within the vertical interval, substantially increased immunity to noise impulse is obtained.

Figure 5A:
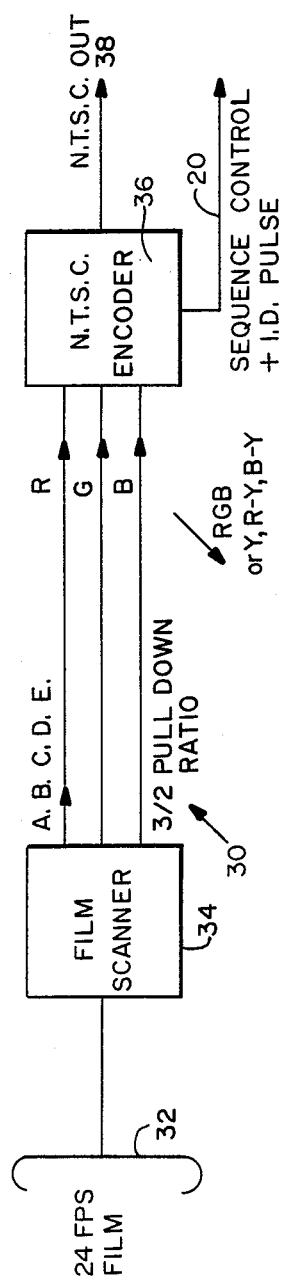
FIG. 5A is a block diagram of an encode/transmit process for film-to-video transfer which generates sequence control and ID pulses enabling line doubling to be employed by a decode/scan line doubler display process in accordance with the principles of the present invention.

A film-to-video transfer process 30 is illustrated diagrammatically in FIG. 5A. Therein, a movie film 32 is presented to a film scanner 34 on a conventional three to two pull down ratio (i.e. three fields for film frame A, two for film frame B, three for C, etc.), as shown in graphs C of FIGS. 1 and 4. Red, green and blue video outputs are encoded within a conventional NTSC encoder 36, and the resultant quadrature modulated subcarrier color television signal is then put through a transfer medium 38, such as a television broadcast or cable television channel, or a magnetic or optical recording medium. The signal occupies the conventional (NTSC) 6 MHz bandwidth. While an NTSC encoder 36 is shown in FIG. 5A, this showing is illustrative only, and other encoders and signal formats may be improved by practice of the present invention.

Added on a line 20 to the signal put out over the transfer medium 38 (typically by the encoder synch generator) are the sequence control marker pulse and the segment ID marker pulse for the reasons already explained.

Figure 5B:
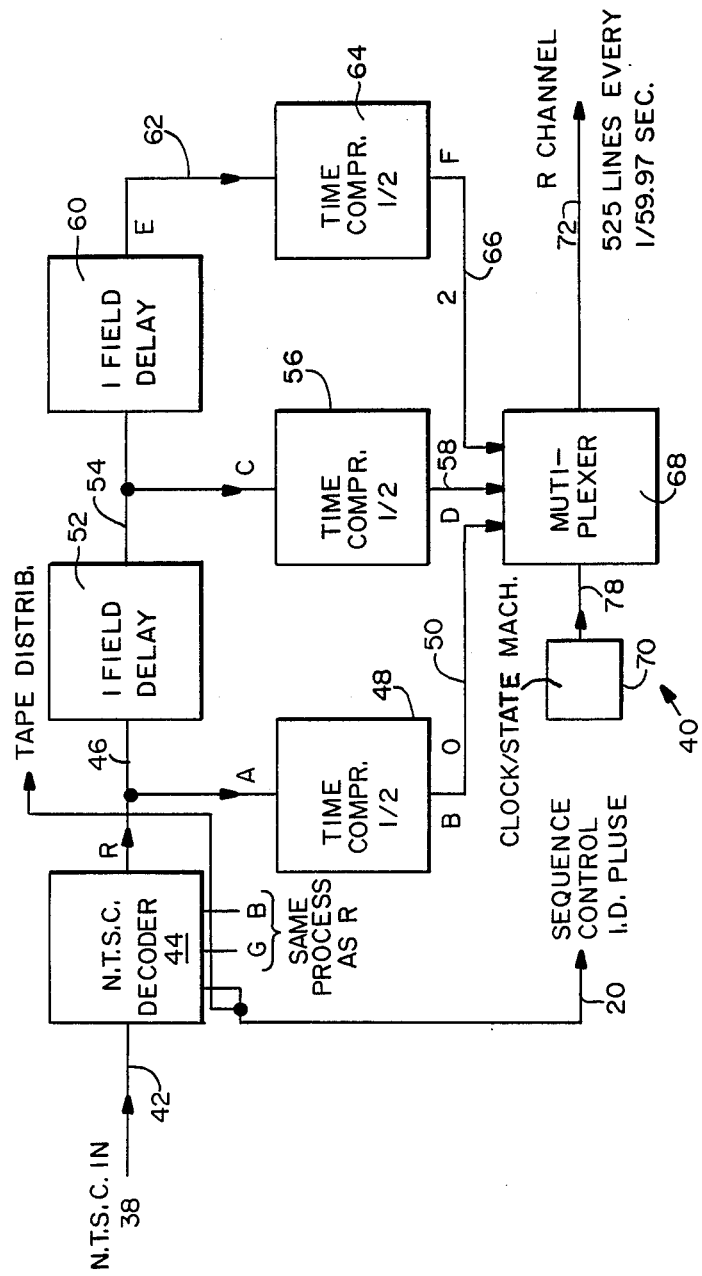
FIG. 5B is a block diagram of a decode/scan line doubler display processor in accordance with the principles of the present invention.

A line doubler/decoder 40 operating in accordance with the principles of the present invention is illustrated in FIG. 5B. An input 42 connects an NTSC decoder 44 to the transfer medium or path 38. The NTSC decoder 44 decodes the incoming composite color video signal into its red, green and blue constituent parts. The red part, for example, is put out from the decoder 44 over a line 46 leading to a first time compressor 48. The time compressor 48 derives and puts out a time compressed scan line for each incoming scan line. If the incoming scan line is 62.5 microseconds in duration, for example, the video information contained in this line is compressed into 31.25 microseconds. The time compressed scan line component is then put out on a line 50 leading as one input to a multiplexer 68.

The red part on the line 46 is also passed through a first one field delay 52 and put out on a line 54 to a second time compressor 56 which puts out a time compressed, one field delayed scan line component over a line 58, and to a second one field delay 60 having an output 62 leading through a third time compressor 64 which puts out a time compressed, two field delayed scan line component over a line 66. Operation of the compressors 48, 56, and 64 is the same, subject only to the field delays 52 and 60. The three output lines 50, 58 and 66 all lead to the multiplexer 68 which, in proper time, selects two sequential time compressed scan lines for each incoming scan line. Thus, for an incoming video field comprising 262.5 scan lines, the multiplexer 68 puts out a video field comprising 525 scan lines, in accordance with the selection pattern for even and odd fields graphed in graphs F and G of FIG. 4.

Figure 5C:
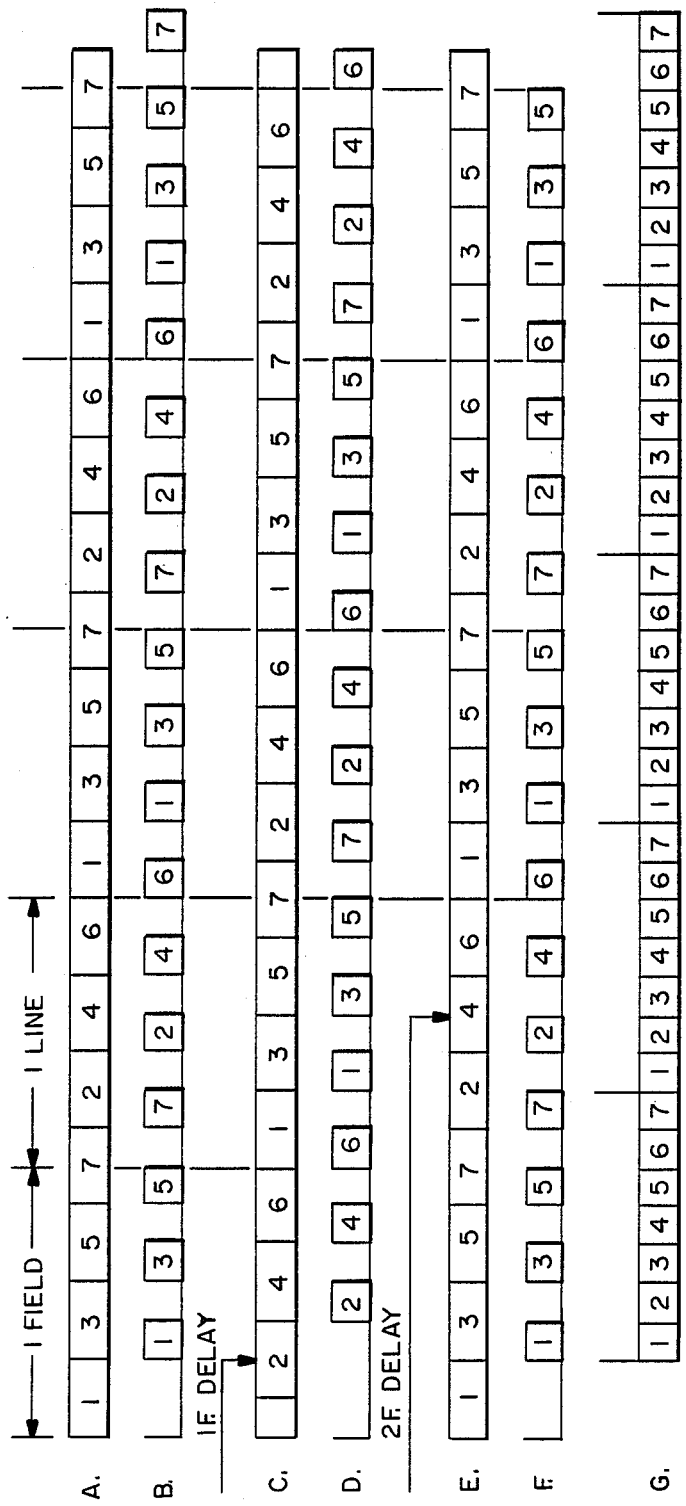
FIG. 5C is a timing diagram illustrating operation of the FIG. 5B processor in the scan line domain, wherein a hypothetical seven line frame is shown to aid understanding.

FIG. 5C sets forth a hypothetical scan/field example to illustrate operation of the multiplexer 68. In the FIG. 5C example each interlaced frame includes seven scan lines, and the odd fields comprise scan lines 1, 3, 5 and half of 7 whereas the even fields comprise the other half of 7 and scan lines 2, 4 and 6. Graphs A and B show the undelayed component as incoming and time compressed incoming video. Graphs C and D show one-field-delayed and time compressed video. Graphs E and F show two-field-delayed and time compressed video. The resultant seven line/field, fourteen line per frame time compressed (line doubled) output is graphed as graph G of FIG. 5C and results from adding the one-line-delayed time compressed graph D signal selectively with the undelayed time compressed graph B signal, or with the twice delayed time compressed graph F signal as selected by a sequence controller 70.

Figures 5D, 5E:
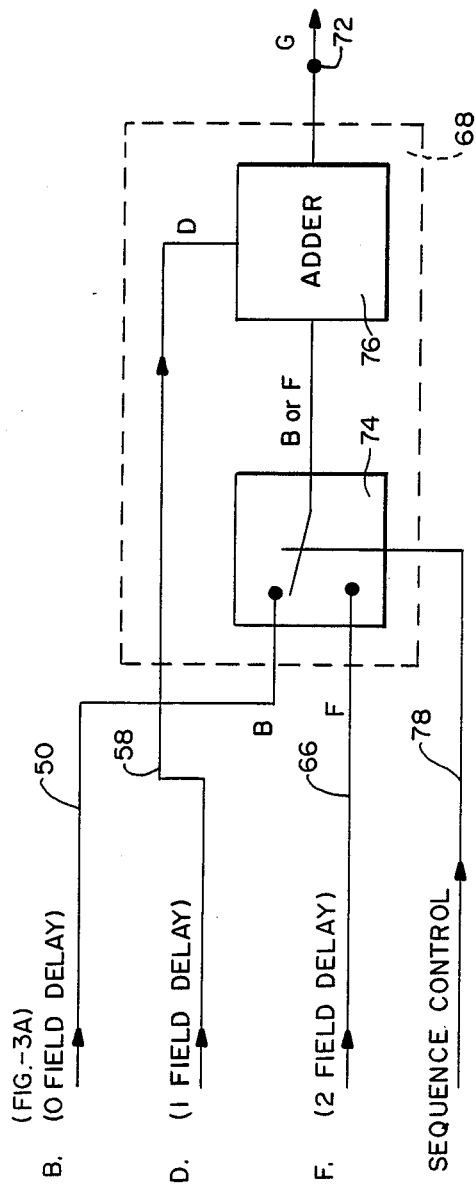
FIG. 5D is a block diagram of a selection multiplexer employed in the FIG. 5B processor.
FIG. 5E is a series of graphs which illustrate operation of the FIG. 5D multiplexer.

FIG. 5D provides greater structural detail for the FIG. 5B multiplexer 68. As shown in FIG. 5D, the multiplexer 68 comprises a single pole, double throw switch 74 and an adder 76. The switch 74 is under the control of a sequence control signal put out on a line 78 by the sequence controller 74. As described earlier, a plurality of different sequences may be used to control the multiplexer 68. In practice, if it appears desireable to select the earliest two fields instead of the latest two fields during the sequence when three fields coming from the same film frame are present at the same time, as shown on graphs B, D and F of FIG. 5E, such selection may be made with satisfactory results. The selectable sequence occurs every five video fields. As shown in FIG. 5D, the function of the multiplexer 68 is e.g. to add the one field delayed time compressed signal on line 58 with either the undelayed and time compressed signal on line 50 or with the twice delayed and time compressed signal on line 66.

FIG. 5E repeats graphs B, D, and F of FIG. 5C as modified to correspond to film frames A, B, C and D of FIG. 4. One exemplary sequence control signal generated by the sequence controller 70 is also shown, and it yields graph G of FIG. 4 as its result, which is the desired line doubled output on the decoder output line 72.

While the method and apparatus of the present invention have been summarized and explained by an illustrative application in improved film-to-video transfer with line doubling, it will be readily apparent to those skilled in the art that many widely varying embodiments and applications are within the teachings and scope of the present invention, and that the examples presented herein are by way of illustration only and should not be construed as limiting the scope of this invention.

I claim:

1. A method for improving apparent picture quality in film-to-video transfer television systems operating in accordance with an odd ratio between film frame display rate and television scan field rate wherein the video scan line rate is multiplied by an integer for display at an output television display device, the method comprising the steps of:

a. transferring each film frame to a television signal of predetermined numbers of even and odd video fields at nominal line scan rate in accordance with a predetermined transfer scheme related to the odd ratio;
   b. selectively passing said television signal through plural, series connected field period delays to provide an undelayed portion and plural delayed signal portions, the total number of such portions being related to the odd ratio;
   c. separately time compressing each portion of the television signal in accordance with an inverse of the integer to provide an undelayed and plural delayed signal time compressed components; and,
   d. selecting at a multiplexer output among the undelayed and the plural delayed components so as to derive line multiplied even and odd output video fields wherein even and odd scan lines are sequentially interleaved according to their spatial relation and wherein each resultant line multiplexed, sequentially interleaved even and odd composite video field obtained at the video output is the video representation of a single film frame.

2. The method set forth in claim 1 comprising the further steps of putting the television signal through a transfer medium, and receiving at a receiver the television signal from the transfer medium.

3. The method set forth in claim 1 wherein the odd ratio is five television fields to two film frames, and the said television signal is passed through two serially connected field period delays to provide an undelayed signal portion, a one field period delayed signal portion and a two field period delayed signal portion.

4. The method set forth in claim 1 wherein the line scan rate is multiplied by two and wherein the time compression steps comprise the steps of compressing each portion of the said television signal by one half.

5. The method set forth in claim 1 wherein the odd ratio is five TV fields to two film frames; wherein the line scan rate is multiplied by two; wherein the said television signal is passed through two serially connected field period delays to provide an undelayed portion, a one field period delayed signal portion, and a two field period delayed signal portion; wherein the time compressing step comprises the step of time compressing each portion by one half; and, wherein the selecting step repetitively selects between the undelayed (0), once delayed (1) and twice delayed (2) time compressed signal components.

6. The method set forth in claim 5 wherein the selecting step is in accordance with the following field period selection matrix to provide a repeating continuous video sequence of alpha and beta segments, as follows:

|  | alpha | beta |
|---|---|---|
| Even Field | 1 0 1 0 1 | 0 1 2 1 2 |
| Odd Field | 0 1 2 1 2 | 1 0 1 0 1 |

7. The method set forth in claim 5 wherein the selecting step is in accordance with the following field period selection matrix to provide a repeating continuous video sequence of alpha and beta segments, as follows:

```
Even Field | 1 2 1 0 1 | 0 1 2 1 2 |
           |   alpha   |    beta   |
Odd Field  | 0 1 2 1 2 | 1 2 1 0 1 |
```

8. The method set forth in claim 5 comprising the further steps of:
   a. generating at least one predetermined marker signal incident to the step of transferring each film frame to a television signal, in order to indicate film-to-video transfer and to distinguish alpha and beta segments; and,
   b. controlling multiplexer operation with the marker signal in order to select among the undelayed, once delayed and twice delayed signal components.

9. The method set forth in claim 8 comprising the further steps of passing the marker signal with the television signal through a transfer medium; and receiving the marker signal with the television signal at a receiver connected to the transfer medium, and separating the marker signal therefrom at the receiver.

10. The method set forth in claim 9 wherein the television signal and the marker signal are encoded into a composite signal in accordance with a predetermined television signal scheme, such as NTSC, wherein the transfer medium is one of television broadcast, cable broadcast and recording, and the composite signal is decoded at the receiver in accordance with the same predetermined television signal scheme.

11. The method set forth in claim 10 wherein the marker signal is included within the vertical synchronizing pulse interval of the television signal.

12. The method set forth in claim 3 wherein the film frame display rate is approximately 24 frames per second and the television field rate is approximately 60 fields per second.

13. The method set forth in claim 12 wherein the film frame display rate is 23.976 frames per second and the television field rate is 59.94 Hz.

14. Apparatus for improving apparent picture quality in film-to-video transfer television systems operating in accordance with an odd ratio between film frame display rate and television scan field rate wherein the video scan line rate is multiplied by an integer for display at an output television display device and comprising:
   film-to-video transfer means for transferring each film frame to a television signal of predetermined numbers of even and odd video fields at nominal line scan rate in accordance with a predetermined transfer scheme related to the odd ratio;
   delay means comprising plural series connected field period delays, having an input connected to the film-to-video transfer means and providing at outputs thereof an undelayed portion and plural delayed signal portions, the total number of such portions being related to the odd ratio;
   time compressor means comprising separate time compressors connected to the outputs of the delay means for time compressing and putting out each said portion of the television signal in accordance with an inverse of the integer to provide an undelayed and plural delayed signal time compressed components; and,
   multiplexer means connected receive the time compressed components for selecting among the undelayed and the plural delayed components so as to derive line multiplied even and odd output video fields wherein even and odd scan lines are sequentially interleaved according to their spatial relation and wherein each resultant line multiplexed, sequentially interleaved even and odd composite video field obtained at the video output is the video representation of a single film frame.

15. The apparatus set forth in claim 14 wherein the odd ratio is five television fields to two film frames, and wherein the delay means comprises two serially connected field period delays and provides as outputs an undelayed signal portion, a one field period delayed signal portion and a two field period delayed signal portion.

16. The apparatus set forth in claim 14 wherein the line scan rate is multiplied by two and wherein the time compressors of the time compressor means compress each portion of the television signal by one half.

17. The apparatus set forth in claim 14 wherein the odd ratio is five TV fields to two film frames; wherein the line scan rate is multiplied by two; wherein the delay means comprises two serially connected field period delays to provide as outputs an undelayed portion, a one field period delayed signal portion, and a two field period delayed signal portion; wherein the time compressors of the time compressor means each time compress its received portion by one half; and, wherein the multiplexer means repetitively selects between the undelayed (0), once delayed (1) and twice delayed (2) time compressed signal components.

18. The apparatus set forth in claim 17 wherein the multiplexer means selects in accordance with the following field period selection matrix in order to provide a repeating continuous video sequence of alpha and beta segments, as follows:

```
Even Field | 1 0 1 0 1 | 0 1 2 1 2 |
           |   alpha   |    beta   |
Odd Field  | 0 1 2 1 2 | 1 0 1 0 1 |
```

19. The apparatus set forth in claim 17 wherein the multiplexer means selects in accordance with the following field period selection matrix to provide a repeating continuous video sequence of alpha and beta segments, as follows:

```
Even Field | 1 2 1 0 1 | 0 1 2 1 2 |
           |   alpha   |    beta   |
Odd Field  | 0 1 2 1 2 | 1 2 1 0 1 |
```

20. The apparatus set forth in claim 17 comprising marker generator means connected to the film-to-video transfer means for generating at least one predetermined marker signal incident to the step of transferring each film frame to a television signal, in order to indicate film-to-video transfer and to distinguish alpha and beta segments; and,
   marker separator means connected to the marker generator means for controlling operation of the multiplexer means with the marker signal in order to select among the undelayed, once delayed and twice delayed signal components.

21. The apparatus set forth in claim 20 further comprising:
   television signal encoder means connected to the film-to-video transfer means and to the marker generator means for encoding the television signal and the marker signal as a composite in accordance with a predetermined television signal scheme, such as NTSC, a transfer medium through which the composite is passed wherein the transfer medium is one of television broadcast, cable broadcast and recording, and receiver means for receiving the composite from the transfer medium and for decoding the television signal and the marker signal in accordance with the same predetermined television signal scheme, and for separating the marker signal and supplying it to the multiplexer means.

* * * * *